(No Model.)
J. A. KIRK.
SOCIAL ATTACHMENT FOR BICYCLES.
No. 317,377. Patented May 5, 1885.
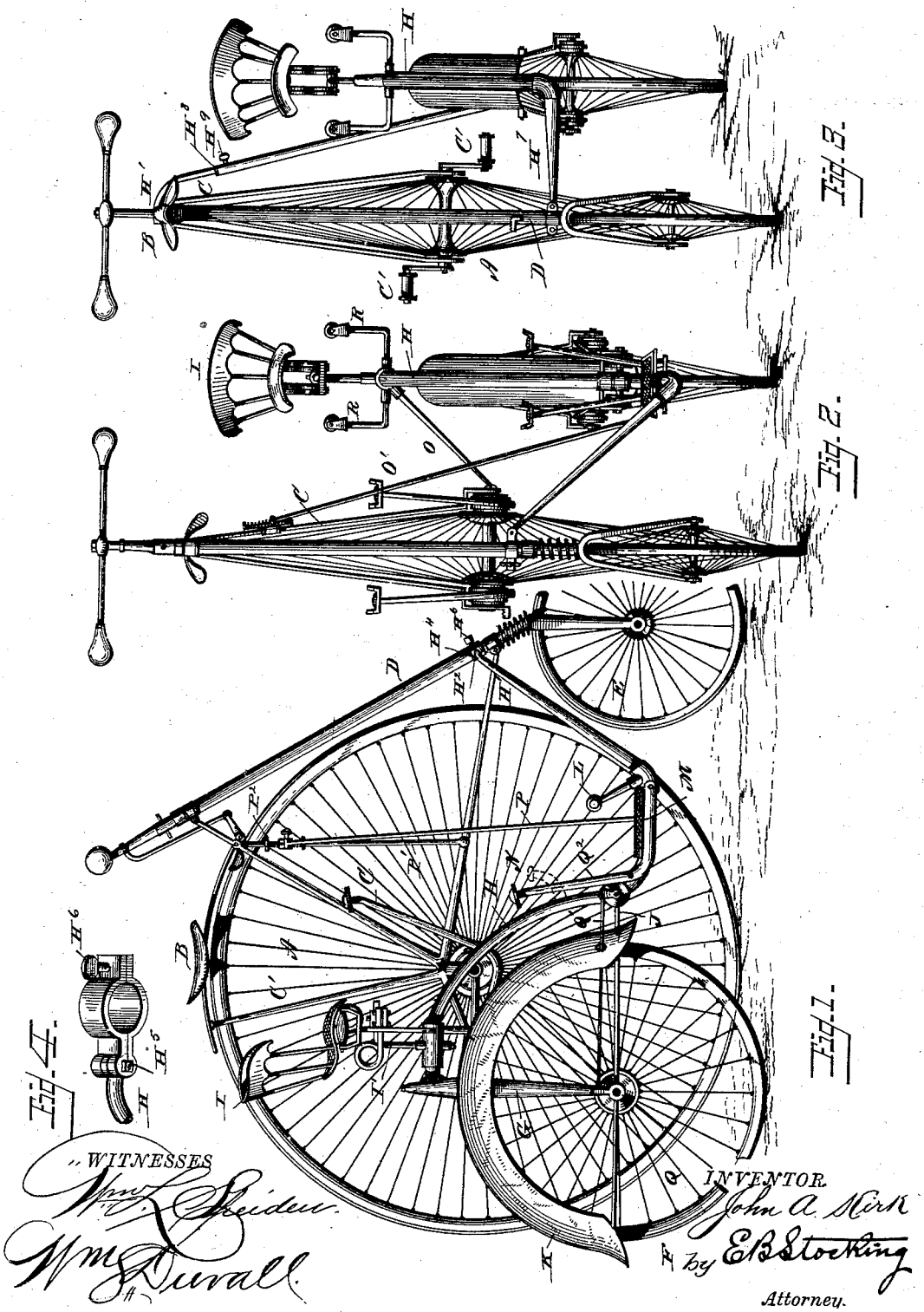

UNITED STATES PATENT OFFICE.

JOHN A. KIRK, OF WASHINGTON, DISTRICT OF COLUMBIA.

SOCIAL ATTACHMENT FOR BICYCLES.

SPECIFICATION forming part of Letters Patent No. 317,377, dated May 5, 1885.

Application filed October 15, 1884. (No model.)

*To all whom it may concern:*

Be it known that I, JOHN A. KIRK, a citizen of the United States, residing at Washington, in the District of Columbia, have invented certain new and useful Improvements in Social Attachments for Bicycles, of which the following is a specification, reference being had therein to the accompanying drawings.

This invention has for its object the provision of a monocycle and devices for connecting the same with bicycles.

The terms "monocycle" and "bicycle" are herein used in the following senses: "bicycle" indicating a two-wheeled vehicle provided with a suitable frame-work, saddle, steering and driving mechanism, the little wheel being either located in front or at the rear of the large or driving wheel, while "monocycle" is intended to indicate a single wheel having a suitable frame-work, seat or saddle, and with or without driving mechanism.

Heretofore tricycles have been constructed in such a manner that they could be transformed into machines adapted for the use of a single rider or operator or for use and operation by two or more riders, which latter form has come to be known as a "social machine;" but I am not aware of any instance of the assemblage with a bicycle of a monocycle in order to render it a "social."

I am aware that the drive-wheel of a bicycle has been provided with a duplicate saddle and driving mechanism, and that two bicycle drive-wheels have been arranged in line with each other and connected by a common backbone, each of the drive-wheels being provided with a saddle and driving mechanism; but I am not aware of any instance of the detachable connection at the side of a bicycle of a monocycle; and my invention consists, broadly, in the means whereby such a result is secured.

My invention further consists in certain features of construction hereinafter described, and specifically set forth in the claims.

Referring to the drawings, Figure 1 is a side elevation of a social bicycle constructed in accordance with my invention. Fig. 2 is a front elevation of the same, and Fig. 3 a modification, the construction illustrated by Figs. 1 and 2 being an adaptation of my invention to the well-known "Star" bicycle, and that in Fig. 3 being its adaptation to a vertical-fork machine. Fig. 4 is an enlarged detail of the clamp.

Like letters indicate like parts in all the figures.

A represents the drive-wheel, B the saddle, C the treadles, D the backbone, and E the small wheel, of a bicycle, all of these elements being of the usual construction, and the steering-rod tube of the "Star" is considered as a part of the backbone of the frame-work of said machine.

The monocycle as herein illustrated comprises the main wheel F, a vertical fork, G, a backbone, H, supporting a seat, I, the backbone and fork being connected by a suitable frame-work or braces, J. A guard, K, is placed over the wheel F, and supported in that position by means of a frame-work and the fork. A foot-rest, L, is arranged on the backbone at the front end of a platform, M, which may or may not be employed, and, if desired, the foot-rest may be placed or adjustably secured at any desired point on the backbone, as shown by dotted lines at N. The backbone is extended laterally, as at H', for connection to the backbone D of the bicycle, while a brace, O, is extended from the backbone, and near the seat-standard I', to a suitable portion of the frame-work of the bicycle—as, for instance, to that extension of the frame-work about on a line with the axle to which one of the levers C is pivoted; or said brace may be extended in a substantially horizontal direction from the backbone H to one of the uprights C' of the frame-work, as shown by dotted lines O'. These two braces, in connection with the contact of the monocycle-wheel with the ground, give three points of support, which are all that are essentially necessary to maintain the monocycle in an upright position, and so as to be carried along with the bicycle as a social attachment, whereby a person may ride the monocycle while another person may ride the bicycle and propel both.

Although it is not absolutely essential, yet it is preferable, that the connections of the braces with the monocycle and bicycle should be pivotal, and I therefore show one form of such connections at $H^2$, the backbone H being constructed as an eye and connected to a hinged clasp, $H^3$, having lugs $H^4$, through which a pin, $H^5$, passes, thereby constituting a hinge-joint, the clasp itself being of any desired construction, adapted to be opened so as to be passed around the backbone D, and to be securely bound thereon by any suitable means, as a screw or bolt, $H^6$.

Although thus specifically describing the construction of the connections, I do not wish to be limited to the exact details set forth, as any attaching devices pivotally connected with the backbone and braces will perform the function specified as preferable. With this pivotal connection of the monocycle with the bicycle curves are more easily and gracefully taken, by reason of the mutual inclination of both machines.

To add further strength I may employ a brace, P, running from the platform M to an upright, P', arranged as a part of the frame-work of the bicycle, said brace P being adapted at its upper end to embrace the standard P', and to reciprocate thereon between two stops, $P^2$, formed on the standard.

Although not essential, the monocycle may be provided with driving mechanism of any desired character—for instance, with a pawl-and-ratchet mechanism, Q, connected by a cord, band, strap, or chain, Q', to suitable treadle-levers, $Q^2$, in which case both riders may assist in propelling the machine.

Any suitable devices for adjusting the elevation of the seat I, or any suitable spring for the same, may be employed. In this instance I illustrate handles R, arranged in proximity to the seat I, and so I may employ other well-known accessories for comfort and safety.

In adapting my invention for use with a vertical-fork machine, the backbone H is at its forward end lengthened so as to be connected either with the fork C or it may be with the backbone beneath the saddle B, the lateral bend H' permitting the side movements of the wheel A when steering the machine. In this instance the backbone H is extended rearwardly with the lateral bend $H^7$, which is connected with the backbone D at a point near the small or rear wheel of the machine. (See Fig. 3, it being a rear view.) By this locality of the points of connection and arrangement of the backbone, which is similar to the arrangement and performs the functions of the braces, I am enabled to provide most if not all of the popular forms of machines with a social attachment, and in the case of vertical-fork machines I may construct the forward lateral bend, H', telescopically, as shown at $H^8$, in order to adapt it for use with machines of varied heights, a set-screw, $H^9$, serving to retain the parts in position after adjustment.

Although I have shown the monocycle slightly in rear of the center of the drive-wheel of the bicycle, yet I do not limit myself in regard to their relative position in this respect, but may alter said position within the limits of the diameter of the wheel, preferring that the position of the monocycle should be at the side of the bicycle and near the center of its drive-wheel.

If desired, a monocycle may be attached to each side of a bicycle, in order that three persons may jointly use the machine, and for this purpose the bent portions $H^7$ $H^7$ of the backbone of the monocycle can be turned to the right or to the left.

Having described my invention and its operation, what I claim is—

1. The combination, with a bicycle, of a monocycle, and of devices for maintaining the latter in operative position at the side of the former, substantially as specified.

2. The combination, with a bicycle and a monocycle, of suitable braces extending from the frame-work of the one to that of the other, and arranged to maintain the two machines side by side, substantially as specified.

3. The combination, with a bicycle, of a monocycle, a portion of the frame-work of which is pivotally connected to the frame-work of the bicycle, and of braces pivotally connected at their ends with the frame-works of both machines, substantially as specified.

4. The combination, with a bicycle, of a monocycle having independent driving mechanism, and connecting devices for maintaining the monocycle at the side of the bicycle, substantially as specified.

5. The combination, with a bicycle, of a monocycle, the backbone of which is extended and bent laterally, and pivotally connected with the backbone of the bicycle, substantially as specified.

In testimony whereof I affix my signature in presence of two witnesses.

JOHN A. KIRK.

Witnesses:
 E. B. STOCKING,
 W. S. DUVALL.